M. J. HARRIS.
MULTIPLE FLOUR SIEVE.
APPLICATION FILED MAR. 22, 1921.
1,403,028.
Patented Jan. 10, 1922.
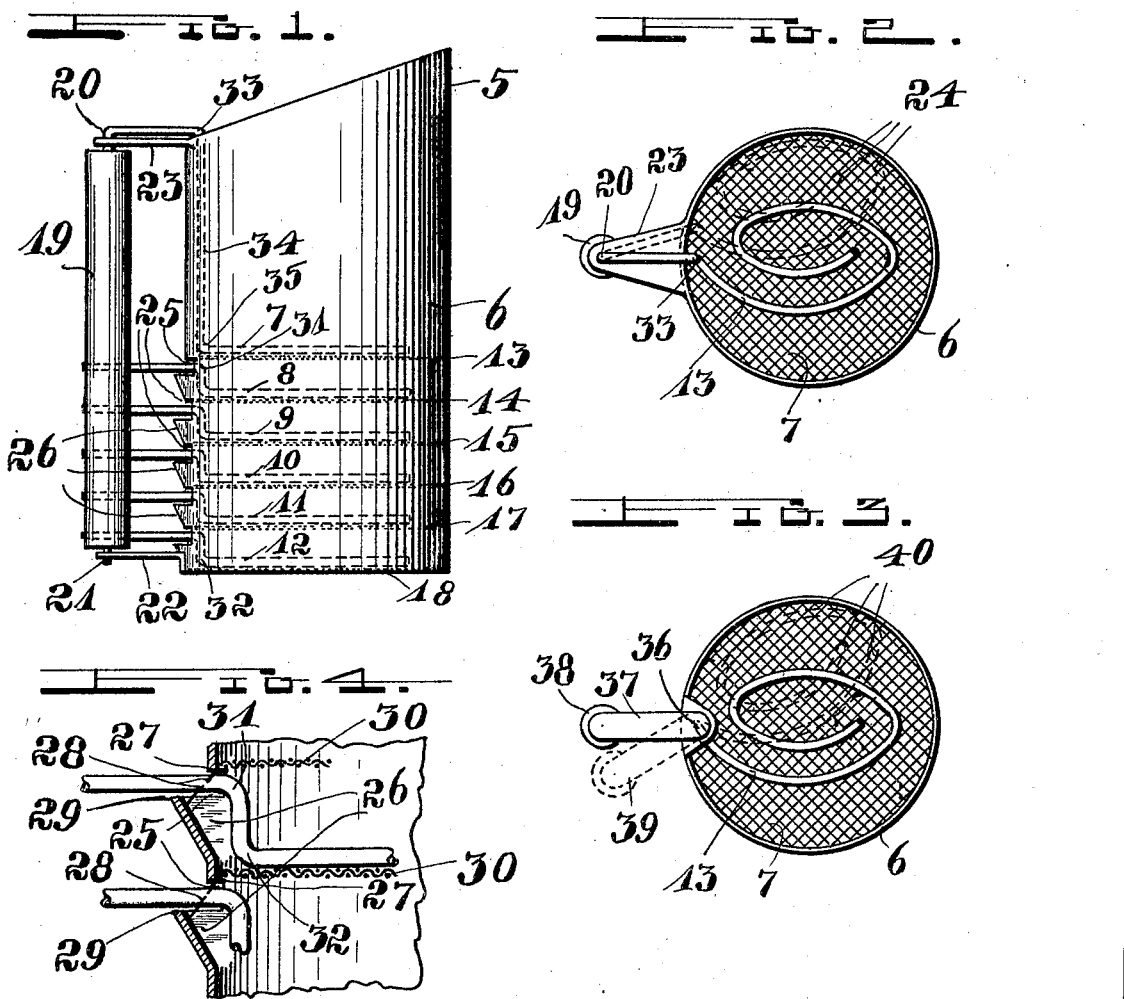
INVENTOR:
MARY J. HARRIS,
BY: Otto H. Krueger
her Atty.

UNITED STATES PATENT OFFICE.

MARY J. HARRIS, OF LOS ANGELES, CALIFORNIA.

MULTIPLE FLOUR SIEVE.

1,403,028.  Specification of Letters Patent.  Patented Jan. 10, 1922.

Application filed March 22, 1921. Serial No. 454,371.

*To all whom it may concern:*

Be it known that I, MARY J. HARRIS, a citizen of the United States, residing at Los Angeles, in the county of Los Angeles and State of California, have invented a new and useful Multiple Flour Sieve, of which the following is a specification.

This invention relates to devices used for sifting flour preparatory to mixing it into dough for baking or cooking purposes.

One of the objects of this invention is to provide a number of sifting means within one utensil, so as to produce several siftings in one operation.

Another object is to provide a sifter with sifting means operated by the supporting hand.

Another object is to provide a kitchen utensil of this type with several screens and a corresponding number of scraping and raking arms, one above the other so as to provide for a multipled sifting of the flour on passing once through the utensil.

Other objects will appear from the following description and appended claims as well as from the accompanying drawing, in which—

Fig. 1 is a side elevation of the device.

Fig. 2 is a top plan view of the device.

Fig. 3 is a top plan view of a slightly modified form.

Fig. 4 is a fragmentary detail vertical midsectional view of two sieves, one above the other, with portions of the scraping and raking arms in proper position.

In baking cake or any other similar article and in preparing meals it is very advantageous to sift the flour before mixing it with the other things used in such preparations. To make the cake especially light and delicate, the flour is sifted several times, which normally requires a corresponding number of operations.

With this device, the flour is scooped or disposed in the upper end 5 of the utensil 6, illustrated in Fig. 1. A suitable number of sieves are provided within the main body of the utensil, as indicated at 7, 8, 9, 10, 11 and 12. A corresponding number of scraping and raking arms are also provided, as indicated at 13, 14, 15, 16, 17 and 18. The sieves are preferably arranged as close as possible one above the other, leaving just enough space that sufficient flour may accumulate between the several sieves to give good results. The scraping, raking or agitating arms are arranged close enough over the top surface of each sieve to assure a proper sifting through each sieve. The arms 13, 14, 15, 16, 17, and 18 are secured to the handle 19. The handle 19 is pivotally engaged to the sieve body, as indicated at 20 and 21. The lugs 22 and 23 are provided on the sieve body to pivotally and swingably support the handle 19. Since the handle is turnable around its pivots 20 and 21, the arms are subjected to a swinging motion by the turning of the handle. The arms can naturally only swing from side to side within the sieve body. The swinging of the arm 13 toward one side is indicated in Fig. 2 at 24.

Holding the handle 19 and slightly moving the hand in which the handle is held from side to side causes the sieve body to swing from side to side around the pivots 20 and 21, thereby causing a scraping, raking and agitating of the arms on the top surface of each sieve, the handle with the scraping and agitating arms being normally practically stationary (except for the slight side motion, made with the hand holding the device), while the sieve body with the several sieves swings from side to side around the pivots 20 and 21 to such an extent as the arms allow, as will easily be understood.

Slots 25 are provided in the sieve body, through which the arms extend from the handle 19 into the sieve body. Flour would naturally fall out of these slots during the sifting and shaking operations, if the slots were just cut through the material of the sieve body with the handle arms in a position just above the sieves. However, small cup-like extensions 26 are so arranged as to be with their upper edge above the slope of the out-falling flour, in relation to the lower edge 27 just above the slot, so as to hold the flour, which would normally fall in about the direction indicated by the dotted line 28, see Fig. 4, the upper edge of the cup-like portion being above the slope-line 28, as indicated at 29.

Two short portions of sieves are indicated at 30. The arms are bent at 31 and 32, passing through the slot 25, just below the one sieve bending downwardly towards the lower sieve and bending again so that the scraping and agitating portion of the arm is in a position just over the top surface of the sieve over which it enters the sieve body, see Figs. 1 and 4.

The uppermost scraping arm is illustrated in the drawing in Fig. 1 as forming the pivot 20, projecting centrally to just within the sieve body, bending downwardly at 33, extending downwardly at 34, and bending at 35 to bring the scraping arm 7 in a position just scraping over the top surface of the uppermost sieve 7.

Six sieves are shown in the drawing in Fig. 1, but it will easily be understood that this device can contain any number of sieves and a corresponding number of scraping and agitating arms to result in a corresponding number of independent sieves within one body.

The slightly modified form, illustrated in Fig. 3, eliminates the slots in the sieve body for the several arms, since the turning shaft 36 is disposed within the sieve body, the several scraping arms being provided on the shaft 36. Lugs 37 project outwardly for supporting the handle 38. The handle swings around the turning shaft to eventually the position indicated in dotted lines at 39. The scraping and agitating arms swing around the shaft 36 to eventually the position indicated at 40. The handle 38, the shaft 36 and the scraping and agitating arms form preferably one combination of parts to be controlled by the handle, in a similar manner as described with reference to the illustrations in Figs. 1, 2 and 4. The sieve body with the several sieves form the swinging member in a similar manner as described with reference to the other illustration.

Having thus described my invention, I claim:

1. In a sieve, a tubular body open at both ends having a number of sieves crosswise to the tubular passage through the body spaced one from the other and having a scoop-like termination at one end, the body having furthermore slots between the several sieves and scoop-like members projecting outwardly at points between each lower sieve and the next slot above.

2. In a sieve, a tubular body open at both ends having a scoop-like termination at one end, the body having slots in a plane transversely to the longitudinal axis of the tubular body, scoop-like members adjacent the slots projecting away from the body to an extent to prevent a wasting of flour through the slots, lugs near the ends of the body outside of the body having apertures of which the center is practically parallel to the longitudinal axis of the body, sieves in the body in a plane transversely to the longitudinal axis of the body, a handle having pivots at both ends in its longitudinal axis to turnably engage with the said lugs, and raking arms on the handle extending through the slots into the body having their operating faces at points to slidingly engage with the sieves.

3. In a sieve, a tubular body open at both ends having a scoop-like termination at one end and having slots in a plane transversely to the longitudinal axis of the tubular body, sieves in the body adjacent the slots with their undersides near the upper edge of the slots and with their top surfaces spaced below the lower edge of the slots in a plane transversely to the longitudinal axis of the body, scoop-like members on the outside of the body each extending upwardly and outwardly from a point above one of the sieves to the lower edge of the slot above, lugs on the outside of the body having apertures with their centers parallel to the longitudinal axis of the body, a handle having pivots at both ends in its longitudinal axis to turnably engage with the lugs parallel to the body, and raking arms on the handle extending through the slots into the body and downwardly having their operating faces at points to slidingly engage with the top surfaces of the sieves.

In testimony that I claim the foregoing as my invention I have signed my name in the presence of two subscribing witnesses.

MARY J. HARRIS.

Witnesses:
OTTO H. KRUEGER,
JESSIE A. MANOCK.